Sept. 4, 1956 J. D. McLEAN, JR 2,761,557

HOLDER FOR MICROSCOPE SLIDES

Filed Aug. 19, 1955 2 Sheets-Sheet 1

HOLDER FOR MICROSCOPE SLIDES
Filed Aug. 19, 1955 2 Sheets-Sheet 2
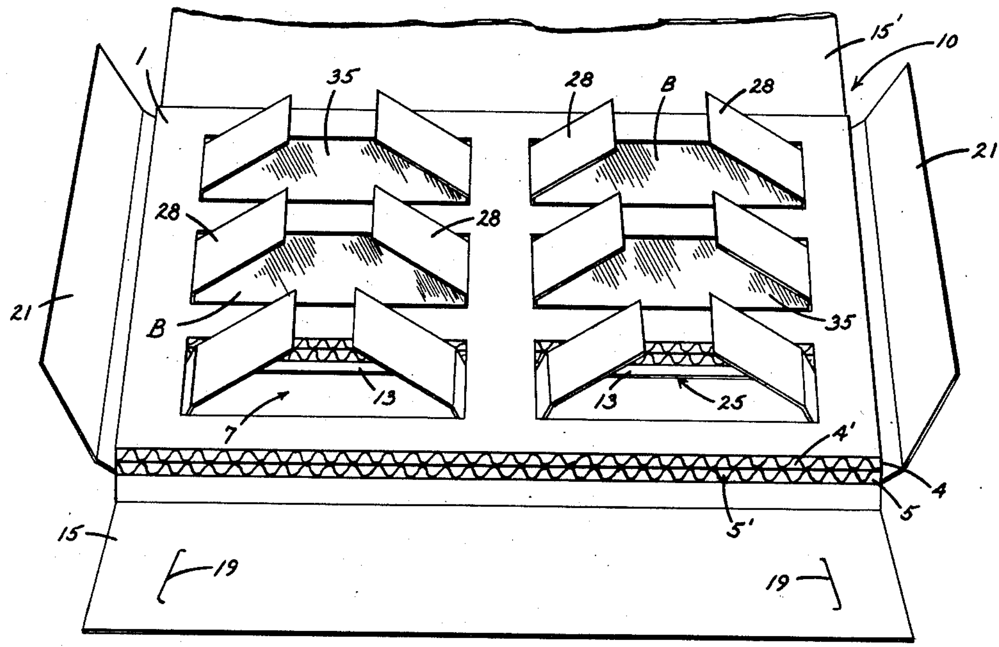
Fig. 3
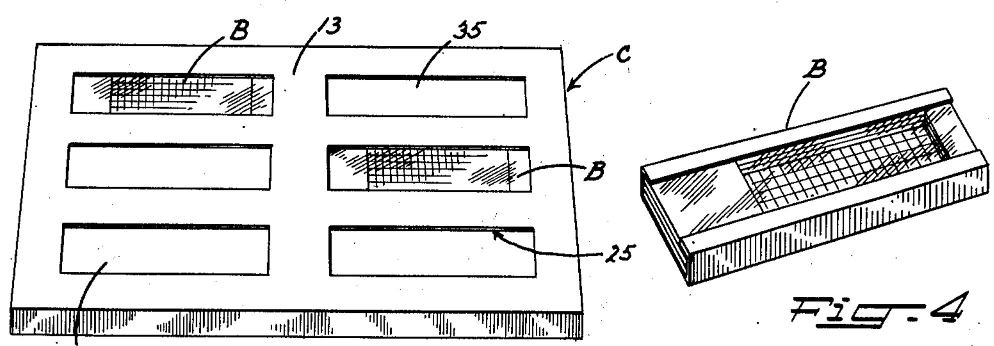
Fig. 4
Fig. 5
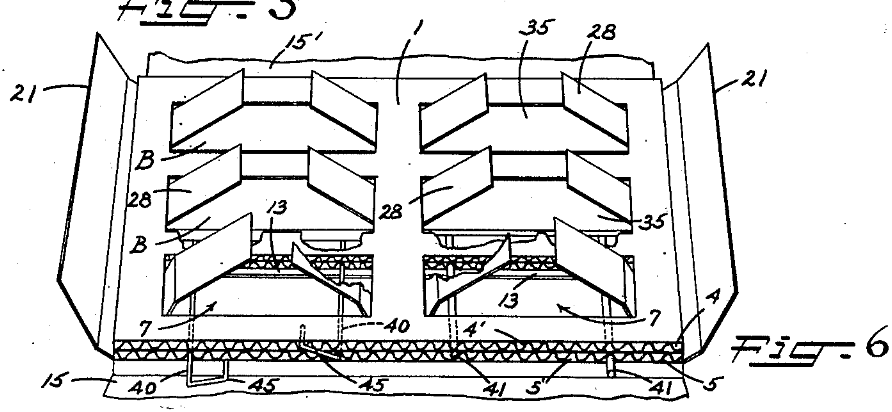
Fig. 6

United States Patent Office 2,761,557
Patented Sept. 4, 1956

1

2,761,557
HOLDER FOR MICROSCOPE SLIDES
James D. McLean, Jr., Fairfax County, Va.
Application August 19, 1955, Serial No. 529,519
10 Claims. (Cl. 206—62)

The present invention relates to an improved holder for articles such as specimen slides. In particular, the invention is concerned with a holder for microscope slides which have micromatter mounted thereupon.

The present invention is a continuation in part of my United States patent application S. N. 451,509 filed August 23, 1954. In certain fields of science, such as geology and biology, a worker accumulates a great many specimen microscope slides (also termed microslides) which must necessarily be retained for reference purposes. With present operations, the slides are usually stored in individual fashion in specially designed slide trays which trays are in turn stored within expensive, specially designed cabinets. The worker must continuously expend large sums of money for additional cabinets and trays to provide storing space for his ever increasing supply of specimen microslides.

The worker also frequently finds it necessary to mail the slides to associates, customers, and clients. The general practice, when mailing the slides, is to remove the slides from the trays and place them in mailing containers such as small wood boxes or stiff paper envelopes. When a plurality of the slides are to be mailed to the same destination, much time is consumed in packaging the slides for mailing as each slide must be handled individually.

An additional problem is presented, especially with the mailing of the microslides, when the worker must deal with slides of different thicknesses, for example, the ordinary thin glass microslide common to biological usage and the thicker micropaleontological cardboard slide with aluminum clip and glass cover, such as may be used for mounting small fossil bugs obtained from well drilling samples.

It is one object of the present invention to provide an inexpensive, improved, and novel microslide holder of simple construction, which holder may be filed in standard size, general, office filing cabinets, thus eliminating the use of expensive, specially designed slide filing cabinets.

It is another object of the invention to provide an improved and novel slide holder which, in addition to the above object, is also used as a mailing container for the slides already mounted therein.

It is a further object of the invention to provide an inexpensive, improved, and novel slide holder which will accommodate microslides of different thicknesses for both filing and mailing purposes.

Figure 1:
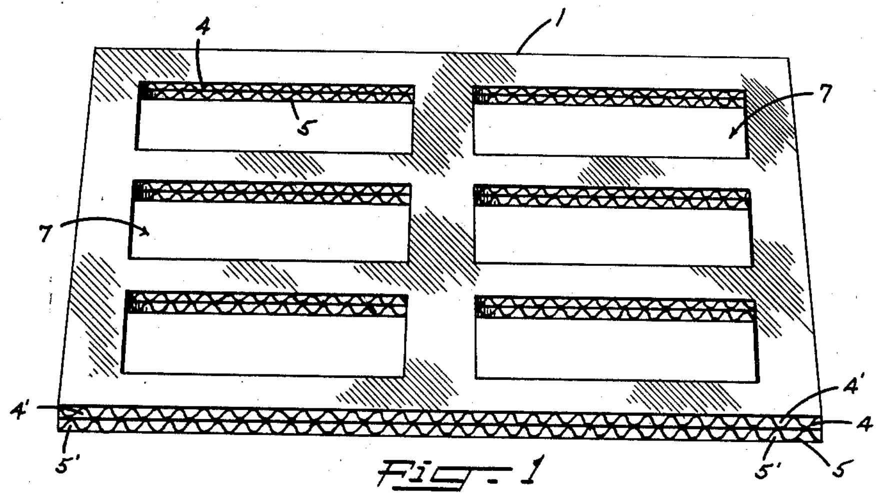

A better understanding of the invention may be had from the following description and drawings in which:

Figure 1 is a perspective of the insert piece for the slide holder.

Figure 2:
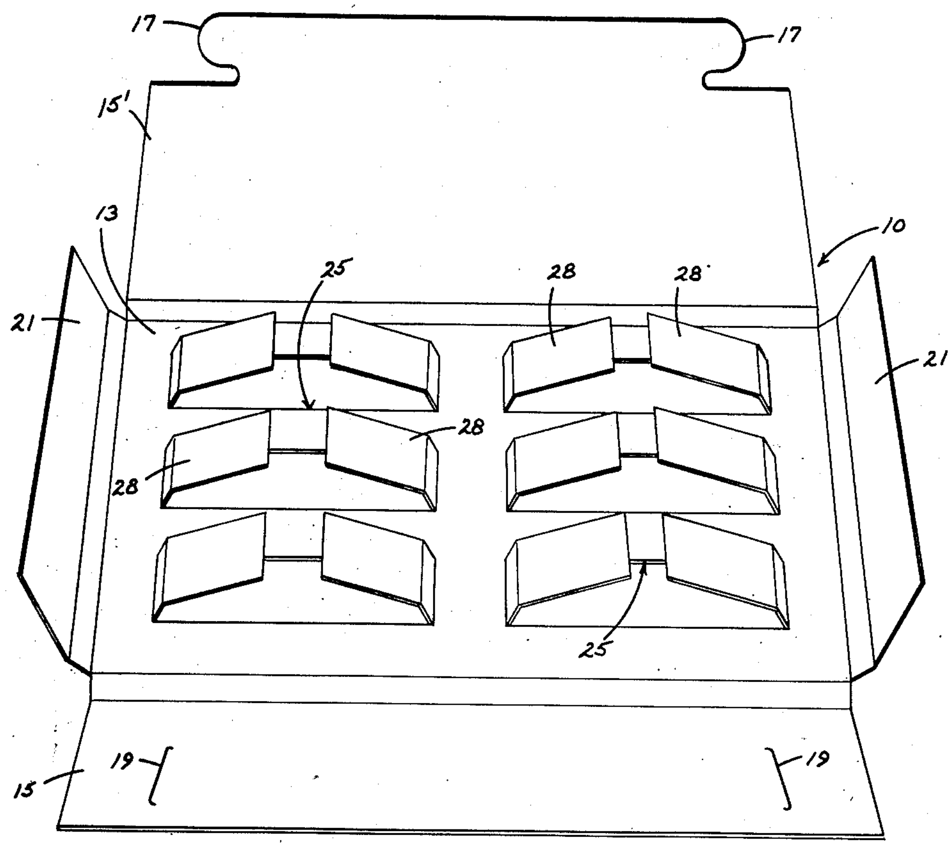

Figure 2 is a perspective of the envelope for the insert piece showing the envelope windows and the slide retaining flaps, Figure 3 is a perspective of the slide holder partially assembled showing the cooperating relationship of the insert piece with the envelope, Figure 4 is a perspective of a typical large micropaleontological slide for mounting microbug fossils, Figure 5 is a perspective of the fully assembled slide holder, and Figure 6 is a perspective of an embodiment of the slide holder.

Briefly, the improved and novel slide holder comprises an insert piece with at least one cut out slide slot extending therethrough. An envelope is provided for the insert piece which has at least one window in the envelope face, which window is smaller than the insert piece slot. The envelope window fits over the insert piece slide slot. There is provided at least one slide retaining flap affixed to the envelope adjacent the border of the window, which flap extends inwardly of the envelope face and extends through the slide slot in the insert piece adjacent the wall of the insert slot. The slide retaining flap is adapted to be folded over a slide placed within the insert piece slide slot. The opposite face of the slide may be retained by the envelope window ledge (that portion of the envelope face bordering the window) or by retaining means such as pins which are positioned within channels of the insert piece. The channels intersect the slide slots of the insert piece.

2

Referring now to the drawings, the invention will be described in its preferred form. As seen in Figure 1, the slide holder comprises an insert piece 1 which is preferably formed from double corrugated layer cardboard. The two corrugation layers, identified as 4 and 5, are so assembled that the corrugation channels 4, 4' and 5, 5' of the layers lie in parallel relationship. The insert piece 1 has cut out slide slots generally identified as 7, 7 which extend through the insert piece.

As seen in Figure 2 of the drawing, an envelope generally identified as 10 and preferably formed of relatively thin paperboard is provided for the insert piece 1. The envelope 10 comprises a face or front section 13 and includes back forming flaps 15, 15' which extend from the envelope face and which fold back from the front section to form the back of the envelope. The flap 15' includes locking elements 17, 17 which fit into locking slots 19, 19 of flap 15 to lock the flaps together. Side flaps 21, 21 extend from the sides of the envelope face and fold backward of the envelope face to be inserted beneath the back forming flaps 15, 15' of the envelope 10.

The envelope 10 has windows generally identified as 25, 25 cut through the face 13 of the envelope, which windows define an area smaller than that of the slide slots 7, 7 of the insert piece 1. The windows 25, 25 are so cut through the envelope face 13 that they coincide or fit over the larger slide slots 7, 7, of the insert piece 1. Extending preferably from the opposite end walls of the windows 25, 25 of the envelope face 13 are slide retaining flaps 28, 28 which, as shown in the drawings, are formed from that portion of the envelope face cut out, but not completely severed from the envelope. If desired, however, the slide retainer flaps 28, 28 may be separate from the envelope and affixed to the envelope face adjacent the window end walls with an adhesive or other suitable affixing means.

Figure 3 shows the envelope 10 and the insert piece 1 in partially assembled relationship. As seen therein the slide retainer flaps 28, 28 of the envelope face 13 are bent backwardly from the envelope face and extend through the slide slots 7, 7 of the insert piece 1 adjacent the end walls of the slide slots. As mentioned above, the windows 25, 25 of the envelope front 13 lie immediately opposite the slide slots 7, 7 of the insert piece 1.

In Figure 3, both the thin glass usual microslides identified as 35, 35 and the thicker micropaleontology slides identified as B, B (shown more clearly in Figure 4) are shown positioned within the slide slots 7, 7 of the insert piece 1. The capability of the slide slots 7, 7 to accommodate microslides of varying thickness is an important feature and advantage of the invention. In the assembled structure of Figure 3, the slides 35, 35 and the slides B, B are retained in place within the slide slots 7, 7 of the insert piece 1 by the slide retainer flaps 28, 28 on one side of the slides and on the other side by those portions of the envelope face 13 bordering the envelope windows 25, 25.

The completely assembled slideholder C is shown in Figure 5 of the drawings. As seen therein, the thin glass usual microslides 35, 35 and the thicker micropaleontology slides B, B are seen through the windows 25, 25 of the envelope face 13. Here, the larger slides B, B and the smaller slides 35, 35 may be positioned in the holder C in any pattern desired.

An embodiment of the invention is shown in Figure 6 of the drawings wherein different type slide retainers such as round metal pins 40, 40 and wooden dowels 41, 41 are inserted through the first or lower series of channels 5′, 5′ defined by the corrugation layer 5 of the insert piece 1. In this embodiment, the thicker micropaleontological slides B are positioned within the slide slots 7, 7 cut through the left-hand side of the insert piece 1 while the thinner glass biological microslides 35, 35 are positioned within the slide slots 7, 7 cut through the right-hand side of the insert piece 1. The slides are retained in position on their one face by the retainer pins 40, 40 and 41, 41 and on their opposite face by the slide retaining flaps 28, 28. As seen in Figure 6, the slide retaining pins 41, 41 which retain in place the thinner usual glass biological slides 35, 35 are of larger cross section than the pins 40, 40 which retain in place the thicker micropaleontological slides B, B. The slide retainers 40, 40 and 41, 41 prevent the slides 35, 35 from bumping around within the slide slots 7, 7 when the slide holder C is moved around or jostled. The large cross section retainers 41, 41 (wooden dowels) fill up the major portion of the depth of the slide slots 7, 7 not taken up by the slides 35, 35 while the smaller cross section pins 40, 40 fill up the minor portion of the depth of the slide slots 7, 7, not taken up by the thicker slides B, B.

One end of each of the metal pin retainers 40, 40 has a crook 45 therein, which may be inserted in one of the adjacent channels 4′ or 5′ to firmly lock the pins in place within the insert piece 1.

It should be pointed out here that the metal pins 40, 40 of small cross section may also be used to hold the thinner glass biological slides 35, 35 firmly in place within the slots 7, 7 of the insert piece 1. In this instance, the metal retaining pins 41, 41 are positioned within the upper or second series of channels 4′, 4′ defined by the corrugation layer 4. In such position, the metal pins will lie against the face of the slides to hold them firmly in place within the slots 7, 7 of the insert piece 1.

The embodiment shown in Figure 6 is especially desirable when the slides are to be mailed, since the pin retainers 40, 40 and 41, 41 prevent the slides from bumping around within their slide slots 7, 7, thereby preventing damage to the fossil bug or other specimen mounted on the slides.

The insert piece 1 may also be constructed from wood, moulded plastic or other suitable material, in which case the channels are drilled out of the uncut portions of the insert piece 1 or formed during the moulding operation.

The advantages of the slide holder described hereinabove are many and diversified. The holder is simple in construction and inexpensive, and can be used to house a single slide or a plurality of slides of the same or of different thickness. The holder, with the slides positioned therein, may be stored in standard, office filing cabinets such as 8 by 11 inch or 5 by 8 inch cabinets; depending upon the size of the holder. Specimen identification for describing the specimens held by the slides in the holder, may be noted at various places on the envelope. This eliminates the necessity of maintaining separate filing cabinets for the slides and identification cards. In addition, small identification tabs may be affixed to the envelope. If the slides are to be mailed, the holder containing the desired slides may merely be removed from the file cabinet, placed within a suitable outer heavy mailing envelope, such as one constructed of cardboard, and mailed; thus eliminating the need of handling each slide individually when packaging them for mailing. If necessary, cardboard sheets may be placed against both the top and bottom surface of the holder before it is placed within the mailing envelope to provide additional support for the holder. The holder may be reused numerous times for both mailing and filing purposes.

It is to be understood that the foregoing description is merely illustrative and that changes and variations may be made without departing from the spirit and scope of the invention as defined in the appended claims.

I claim:

1. A slide holder comprising an insert piece, at least one cut out slide slot in the insert piece extending through the insert piece for accommodating slides of different thickness, an envelope for the insert piece, at least one window in the face of the envelope, said window fitting over the insert piece slide slot, at least one side retaining flap on the envelope adjacent the border of the window which flap extends inwardly of the envelope face and extends through the slide slot in the insert piece at a point adjacent the wall of the insert slot, said slide retaining flap being adapted to fold over the back of a slide placed within the insert piece slide slot, and at least one set of aligned channels through the insert piece for accommodating additional slide retaining means which retaining means lies adjacent the front of the slide placed within the insert piece slide slot, said channels intersecting the slide slot.

2. A slide holder according to claim 1 comprising two sets of window intersecting aligned channels through the insert piece for accommodating slide retaining means.

3. A slide holder according to claim 2 comprising slide retainers positioned within the channels.

4. A slide holder according to claim 3 comprising slide retainers of small cross section for retaining in place slides of a thick nature.

5. A slide holder according to claim 3 comprising slide retainers of large cross section for holding in place slides of a thin nature.

6. A slide holder according to claim 1 comprising plurality of slide slots in the insert piece, a first series of slide retainer channels in the insert piece which lie adjacent the side of the insert piece facing the envelope face, and a second series of slide retainer channels in the insert piece which lie adjacent the side of the insert piece facing the back of the envelope.

7. A slide holder according to claim 6 comprising slide retainers positioned within the first series of aligned channels for retaining in place thick slides positioned within the slide slots, and slide retainers positioned within the second series of channels for retaining in place thinner slides positioned within slide slots other than those slides containing the thicker slide slots.

8. A slide holder according to claim 6 comprising slide retainers of large cross section positioned within the first series of channels for retaining the thinner slides in place within the cut out slide slots of the insert piece, and slide retainers of smaller cross section also positioned within the first series of channels for retaining thick slides in position within the cut out slide slots of the insert piece other than those slots containing the thin slides.

9. A slide holder according to claim 6 comprising an insert piece formed of two layers of corrugated cardboard.

10. A slide holder according to claim 9 wherein the channels formed by each corrugation layer lie parallel with one another.

References Cited in the file of this patent

UNITED STATES PATENTS 2,119,343 Myers ---------------- May 31, 1938